United States Patent
Kvachev

(10) Patent No.: US 10,462,416 B2
(45) Date of Patent: Oct. 29, 2019

(54) FACE PLATE COVER FOR OUTDOOR IN-LINE MULTITAP

(71) Applicant: Sergey Kvachev, Utica, NY (US)

(72) Inventor: Sergey Kvachev, Utica, NY (US)

( * ) Notice: Subject to any disclaimer, the term of this patent is extended or adjusted under 35 U.S.C. 154(b) by 41 days.

(21) Appl. No.: 15/616,378

(22) Filed: Jun. 7, 2017

(65) Prior Publication Data
US 2018/0358741 A1 Dec. 13, 2018

(51) Int. Cl.
*H04N 7/10* (2006.01)
*H01R 31/02* (2006.01)
*H01R 24/54* (2011.01)

(52) U.S. Cl.
CPC ............. *H04N 7/10* (2013.01); *H01R 24/547* (2013.01); *H01R 31/02* (2013.01)

(58) Field of Classification Search
CPC .. H01R 13/5841; H01R 9/0506; H01R 24/38; H01R 31/02; H01R 2103/00
USPC ........................................................ 333/100
See application file for complete search history.

(56) References Cited

U.S. PATENT DOCUMENTS

| | | | |
|---|---|---|---|
| 4,542,437 A | 9/1985 | Ellis et al. | |
| 5,635,881 A | 6/1997 | Romerein et al. | |
| 6,175,483 B1 * | 1/2001 | Matsubara | H01R 24/52 361/106 |
| D623,598 S | 9/2010 | Kondo | |
| 8,120,450 B2 | 2/2012 | Kondo et al. | |
| 2006/0005958 A1 | 1/2006 | L'Henaff et al. | |
| 2009/0077608 A1 | 3/2009 | Romerein et al. | |
| 2014/0017919 A1 * | 1/2014 | Kelley | H01R 13/447 439/135 |
| 2015/0349455 A1 * | 12/2015 | Kern | H01R 43/00 439/519 |

* cited by examiner

*Primary Examiner* — Robert J Pascal
*Assistant Examiner* — Kimberly E Glenn
(74) *Attorney, Agent, or Firm* — Bernhard P. Molldrem, Jr.

(57) ABSTRACT

An outdoor, in-line cable splitter or multitap is situated in a pedestal and connects a number of customer drop cables with an underground or buried main trunk cable or network cable. To avoid sharp bends in the customer cables, the face plate of the multitap has customer connectors that are bent downwards at an angle. In an example the customer drop connectors can emerge straight out at 90 degrees to the face plate and then angle down about 45 degrees. This allows room in the pedestal enclosure for the male connectors on the drop cables. The face plate can be exchanged for the corresponding face plate of a previously installed multitap.

5 Claims, 2 Drawing Sheets

FACE PLATE COVER FOR OUTDOOR IN-LINE MULTITAP

BACKGROUND OF THE INVENTION

The present invention is directed to devices used in distribution of signals over coaxial cable, for example, in the cable television industry. The invention is more particularly concerned with an in-line cable splitter, or multitap, used by a cable service company to connect a number of customer drop cables with a main video trunk cable or network cable. These devices are frequently used outdoors and installed in a pedestal that allows access to an underground trunk cable and also allows access to underground customer drop cables that proceed from the pedestal to the customers' homes or businesses.

Pedestals are small vertical structures, typically of steel construction, which rise from a platform on the ground and house the splitter or multitap. A cover can be removed or opened for access to the multitap and to the cables, and can be replaced and locked to limit access. These pedestals usually have very limited space or volume, providing very little room for the customer cables to connect to the multitap. That is, in a current outdoor in-line multi-tap, the connector ports for the customer cables protrude straight out (horizontally) from the face plate of the multi-tap. The male connector at the end of the customer drop cable is stiff and does not bend sharply, so the limited space inside the pedestal enclosure can lead to over-stressing the cables once the pedestal is closed up. The current way this is addressed is by using a jumper cable, of lower quality than the drop cable, to connect between the customer cable connector and the multitap customer port or tap. This can introduce an unacceptable signal loss.

OBJECTS AND SUMMARY OF THE INVENTION

Accordingly, it is an important object of this invention to provide an improved outdoor in-line multitap or splitter that can be employed for installation in a pedestal and which will avoid the drawbacks of the prior art.

It is a related object to provide a modified face plate for an existing multitap of this type which will allow the customer drop cables to be connected directly onto the customer ports of the device without imposing strain on the customer drop cables, and which makes the use of jumper cables unnecessary.

It is a more specific object to provide an improved multitap or at least an improved face plate for a multitap, which has its customer ports angled downward at an angle that is appropriate such that the male connectors of customer drop cables extend downward at an angle and then the cable can bend gently towards the downward vertical so that the customer cables can be installed and connected easily and do not undergo strain of sharp bending within the housing or pedestal.

In accordance with an aspect of this invention, an outdoor directional in-line multitap cable communication distribution device is provided with an improved face plate cover. The multitap device itself comprises a body portion or housing that contains suitable distribution signal conditioning circuitry. A pair of network trunk cable ports at a lower side of the body portion are each adapted to connect to an input network cable and an output network cable, respectively, and are connected with the device's signal conditioning circuitry to provide video output signals. These go to a plurality of customer drop cables. The face plate or cover is closed onto the body portion or housing, with a gasket member disposed between a periphery of the housing or body portion and the face plate cover. The face plate cover has a plate member that removably attaches onto the body portion, typically being secured with threaded fasteners (e.g., bolts). The face plate member has a number of customer connector ports affixed on the face plate member and projecting from it. There can be two, four, eight or a larger number of customer ports. Each of the customer connector ports has a (female) customer coax connector of generally tubular shape, with a base portion that projects out from the face plate at a right angle to the face plate and a connector portion, i.e., tip, that is angled downward at about 45 degrees from the base portion. In this arrangement, the connector end of a customer drop cable can be joined to the respective customer connector port at a downward angle of about 45 degrees, and the drop cable can bend gradually to the downward vertical, without need for a jumper and without imposing undue mechanical stress on the customer drop cable when the pedestal cover is closed up.

The improvement can take the form of an improved in-line multitap which incorporates the cover plate with the downward-bending customer ports or taps, or can take the form of a replacement cover plate for an existing in-line outdoor multitap having the feature of downward-bending customer ports or taps.

DETAILED DESCRIPTION OF A PREFERRED EMBODIMENT

Figure 1:
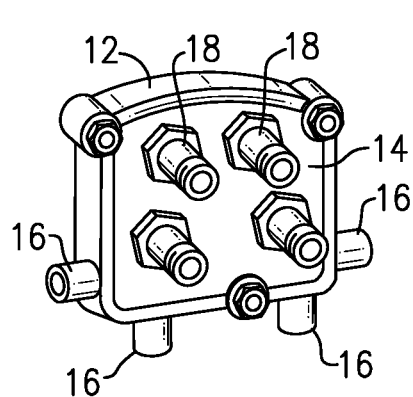
FIG. 1 is a perspective view showing a typical in-line outdoor multitap device, according to the prior art.

With reference to the FIG. 1 of the Drawing, a conventional in-line splitter or multitap 10 has a casing or housing 12 on which is mounted a face plate 14 here held in place with a number of bolts or machine screws onto the front of the casing 12. Typically there are a number of circuit boards positioned within the casing or housing for processing and distributing broadband video, and as they are conventional these are not shown here. There are network cable ports 16 on the bottom and at the sides (for optional overhead installation) of the housing 12 and to these are connected the input side and the casing or housing. The face plate 14 has a number of customer ports 18 that project out, i.e., generally at a right angle to the face plate, i.e., horizontal in the case of a pedestal installation. Normally the customer drop cables (not shown here) would be installed one at each customer port to distribute the broadband video to various customer locations, e.g., homes and/or businesses. Because of the limited space within the pedestal, an installation of a standard multitap within a conventional pedestal can result in a sharp bend near the male connector of the drop cable, which may cause damage and/or signal loss. The usual solution to this is to use a jumper cable between the drop cable and the customer connector port 16, but this involves a lower quality cable for the jumpers, as well as additional connectors, which each contribute to insertion loss.

Figure 2:
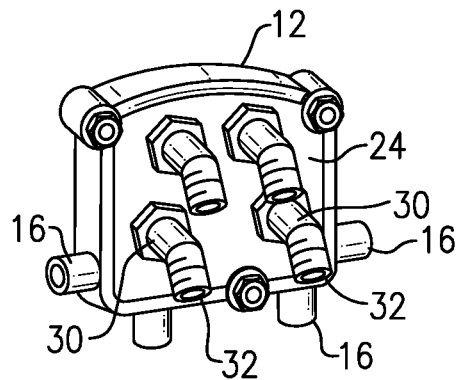
FIG. 2 is a perspective view of an in-line outdoor multitap device improved according to an embodiment of the present invention.

As a solution to this is disclosed in an embodiment of this invention as shown in FIG. 2 which is an outdoor in-line multitap device having a case or housing 12 with network cable ports 16 as in the conventional multitap of FIG. 1, but with a face plate 24 with a plurality of customer ports 28, each having a base portion 30 extending out a short distance from the base plate 24 and an end female F type connector portion 32 that is angled down at an angle of about 45 degrees. This construction allows the male connector of the customer drop cable to be installed without the need for a jumper cable, and without creating a sharp bend in the cable within the tight spacing inside the pedestal.

The face plate 24 of this embodiment is created at the same dimensions as the face plate 14 of the FIG. 1 multitap device 10, and is provided with fittings for threaded fasteners to match the corresponding casing or housing 12, so that the face plate 24 can be substituted for the existing face plate 14 in a previously installed video distribution pedestal. The face plate has electrical and signal fittings (on the reverse side of the face plate) to connect with the circuit boards within the existing casing or housing 12, making possible a simple conversion of the existing multitap by swapping out a replacement face plate for the existing one.

Figure 3:
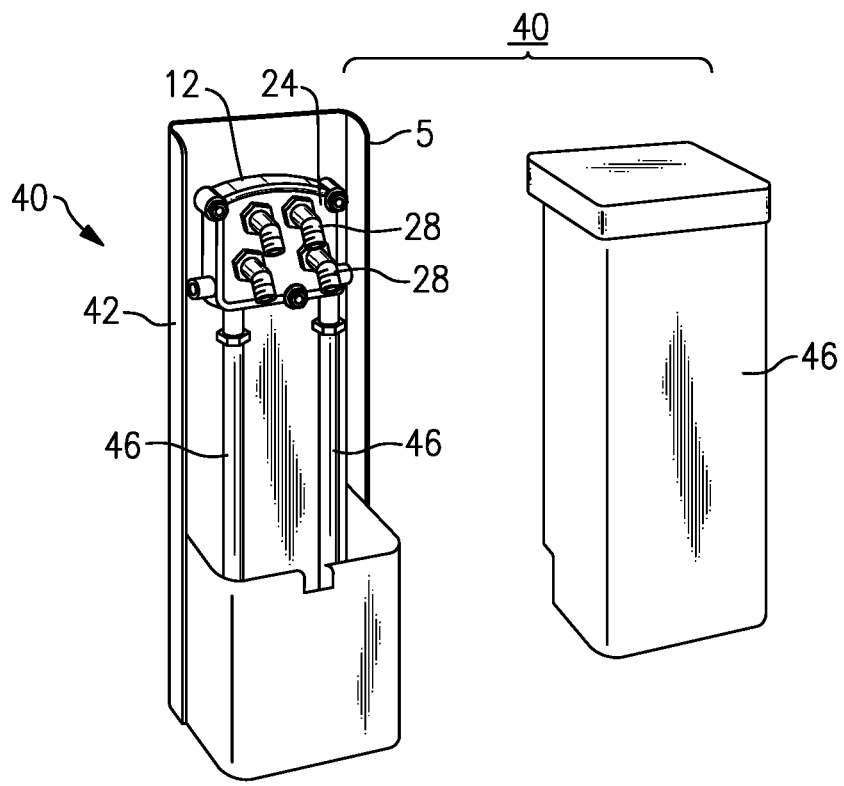
FIG. 3 is a perspective view of the in-line outdoor multitap device installed in an outdoor pedestal enclosure, here shown with the pedestal cover removed.

FIG. 3 illustrates a typical outdoor arrangement for a pedestal installation, namely, a pedestal tower or enclosure 40 with a housing 42 formed as a vertically elongated housing of sheet steel construction, here with a cover 44 removed to show the interior. A multitap 20 is shown having the main housing 12 secured onto the back wall of the pedestal housing 42. The network cable 46 is shown with inlet and outlet sides respectively connected to the inlet and outlet ports 14 and running vertically down into the base of the pedestal 40. The pedestal cover 44 has been removed here, but can be replaced and locked to secure the pedestal after installation. The multitap face plate 24 has four customer outlet ports 28, each with the downward angled end connector portion 32 as illustrated earlier in FIG. 2.

Figure 4:
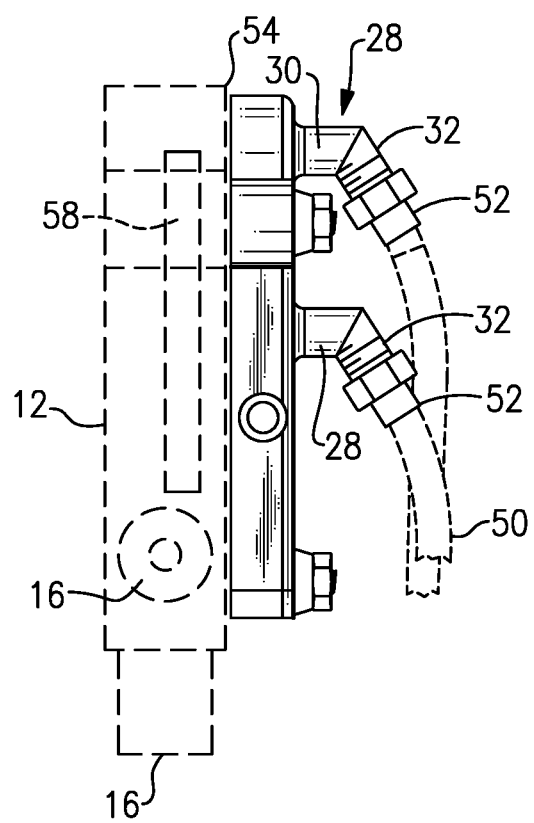
FIG. 4 is a side elevation of the face plate according to this embodiment, with the body portion or housing of the multitap device illustrated in broken line.

FIG. 4 is a side elevation of the face plate of this embodiment with the improved downward-angled customer ports 28. This face plate 24 is interchangeable with the existing or prior-art face plate 14, and is shown here installed on an existing or prior-art housing 12, drawn in broken line. Here two of the customer ports 28 are shown, with the remaining two ports obscured. The male connectors 52 of the respective customer drop cables 50 are connected at the downwardly oriented end connector portions 32. This face plate 24 and main casing 12 have a gasket 54 secured between them at a periphery of the casing 12 providing environmental seal, and favorably also an RF seal. The drop cables 50 are installed with the respective female end connectors 52 at a 45 degree angle so that each drop cable 50 can angle gently down to a vertical orientation, as shown, thus avoiding any sharp bend. FIG. 4 also shows the approximate location of the signal processing and distribution circuitry 58 within the main case or housing 12.

In this embodiment there are four (4) customer connector ports 28 on the associated face plate 24, spaced two above and two below. However, any number of connector ports could be present on a given face plate, and commonly these may have two, six, eight, sixteen, or more customer ports.

These out-door inline multitap devices may have other general shapes or configurations, but can be provided with downward angled female end connectors 32 to permit the associated drop cable to be easily connected at the (approximately) 45 degree downward angle, and to avoid sharp bends in the customer cable or crowding within the pedestal.

There are many variations and modifications that would present themselves to persons of ordinary skill in the art without departing from the scope and spirit of the invention as defined in the appended claims.

What is claimed is:

1. A face plate cover for an outdoor directional in-line multitap cable communication distribution device, wherein the device comprises a body portion containing suitable distribution signal conditioning circuitry; a pair of network trunk cable ports at a lower side of the body portion and adapted to connect to an input network cable and an output network cable, respectively, and connected with said signal conditioning circuitry which provides video output signals to apply to a plurality of customer drop cables; a gasket member disposed between a periphery of said body portion and said face plate cover and forming an RF seal therebetween; the face plate cover comprising a plate member adapted to removably attach onto said body portion and a plurality of customer connector ports affixed on said face plate member and projecting there from; the customer connector ports each formed of a customer connector of generally tubular shape having a base portion that is affixed to and projects out from said face plate member at a right angle to the face plate and a connector portion affixed onto said base portion and angled downward at about 45 degrees from said base portion, such that a connector end of a respective customer drop cable can be attached directly to the respective customer connector port at a downward angle of about 45 degrees.

2. The face plate cover according to claim 1, wherein said plurality of customer connector ports includes four customer connector ports.

3. A video cable installation comprising an underground or buried trunk cable; a pedestal enclosure within which the trunk cable emerges and returns, including a generally vertical housing having a removable cover and a wall onto which a multitap cable communications distribution device is mounted, wherein the device comprises a body portion containing suitable distribution signal conditioning circuitry; a pair of network trunk cable ports at a lower side of the body portion and adapted to connect to an input network cable and an output network cable, respectively, and connected with said signal conditioning circuitry which provides video output signals to apply to a plurality of customer drop cables that extend downward therefrom within the pedestal; a gasket member disposed between a periphery of said body portion and said face plate cover providing an RF seal therebetween; wherein the face plate cover comprises a plate member adapted to removably attach onto said body portion and a plurality of customer connector ports affixed on said plate member and projecting therefrom;

and the improvement wherein the customer connector ports each include a customer connector of generally tubular shape having a tubular base portion that projects out from said face plate cover at a right angle to the plate member and a connector portion affixed to the base portion and angled downward at about 45 degrees from said base portion, such that a connector end of a respective customer drop cable can be attached to the respective customer connector port at a downward angle of about 45 degrees.

4. The video cable installation according to claim 3 wherein said plurality of customer connector ports includes four customer connector ports.

5. The video cable installation according to claim 3 wherein said customer drop cables are connected directly to the respective customer connector ports without employing a jumper cable therebetween.

* * * * *